April 9, 1940.    G. R. GAGNE    2,196,297
TOOL HANDLE JOINT AND THE LIKE
Filed Nov. 30, 1936
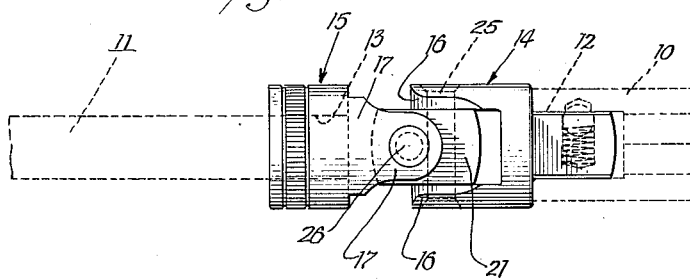
Fig. 1
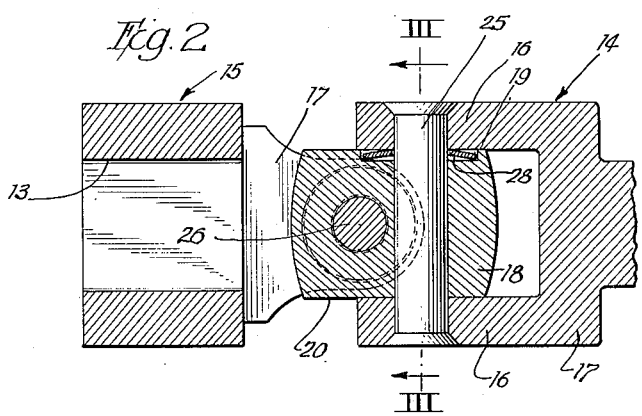
Fig. 2
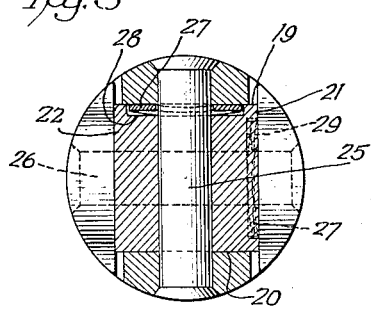
Fig. 3
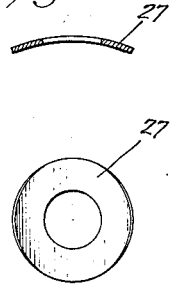
Fig. 4
Fig. 5
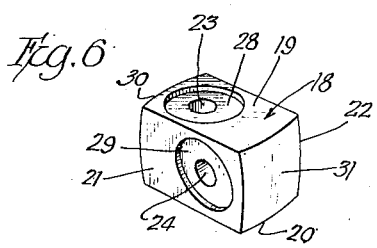
Fig. 6
Inventor
Gideon R. Gagne
BY: Harry C. Roberts
Attorney.

Patented Apr. 9, 1940

2,196,297

UNITED STATES PATENT OFFICE 2,196,297

TOOL HANDLE JOINT AND THE LIKE

Gideon R. Gagne, Kenosha, Wis., assignor to Snap-On Tools, Inc., Kenosha, Wis., a corporation of Delaware Application November 30, 1936, Serial No. 113,293

1 Claim. (Cl. 64—17)

This invention relates to tool handle joints and more particularly to universal joints, although certain features thereof may be employed with equal advantage for other purposes.

It contemplates more especially the provision of a novel tool handle joint having means associated therewith to maintain the complemental parts in any adjusted angular relation.

Flexible joints and particularly universal joints have long been resorted to as a desirable connecting expedient between two members having variable positions, but the relative movement must be sufficiently free to enable the effective use thereof. This free movement is sometimes undesirable owing to the lack of rigidity between the connected members and the inability to maintain such in any adjusted position. In nut turning particularly, universal joints have been utilized in conjunction with handle means to enable access to restrictive locations. The inability of maintaining the complemental parts in adjusted relation, however, has proven very annoying and disadvantageous so that freedom of movement as well as connection rigidity are requisite features in nut turning devices such as wrench and other tool handle accessories.

One object of the present invention is to simplify the construction and improve the operation of devices of the character mentioned.

Another object is to provide an improved tool handle joint which enables free movement and sufficient rigidity to maintain the parts in any adjusted position or relative angular relation.

Still another object is to provide a tool handle joint of novel and simple construction which enables the maintenance of the connected parts in adjusted angular positions.

A further object is to provide a universal joint having the connecting block thereof provided with improved spring means for maintaining the parts in adjusted positions.

A still further object is to provide a universal joint having a connecting block provided with circumferential grooves for retaining simplified spring members establishing frictional contact between the relatively adjustable parts.

Still a further object is to provide a wrench handle having a universal joint with flat resilient spring means for maintaining the parts thereof in angular adjusted relation.

Other objects and advantages will appear from the following description of an illustrative embodiment of the present invention.

In the drawing:

Figure 1 is a plan view of a tool handle joint embodying features of the present invention, there being auxiliary members shown in dotted outline to disclose the type of members utilizable therewith.

Figure 2 is a sectional view in elevation of the device shown in Figure 1.

Figure 3 is a sectional view taken substantially along line III—III of Figure 2.

Figure 4 is a sectional view in elevation of a spring member utilized in connection with a tool handle joint for the purpose set forth.

Figure 5 is a plan view of the device shown in Figure 4.

Figure 6 is a perspective view of a universal joint connecting block which is recessed for the reception of the spring members shown in Figures 4 and 5.

The structure selected for illustration comprises a socket member 10 and a rod member 11 intended for operative connection to a universal joint to be hereinafter described, the former being provided with an opening 12 and the latter with a polygonal extremity 13 for detachable connection with complemental members or parts 14 and 15, respectively, of a universal joint or other tool handle flexing expedient. The rod member 11 may be provided with a suitable handle member to enable the convenient turning thereof together with the parts detachably connected therewith as will presently appear. The joint part 14 is of cylindrical shape and terminates in spaced furcations 16. The socket part 15 of the universal joint is also of cylindrical configuration, and it terminates in correspondingly spaced furcations 17 shaped and spaced to correspond with the furcations 16 for the reception of a connecting block 18 therebetween as will appear more fully hereinafter.

The connecting block 18 is preferably provided with an exterior configuration which imparts a substantially square cross-section thereto so as to define parallel sides 19—20 and 21—22 constituting the exterior thereof. The connecting block 18 is sufficiently elongated to enable the reception thereof between the furcations 16 and 17 which are spaced to correspond with the dimensional extent between the sides 19—20 and 21—22 thereof.

The connecting block 18 is provided with apertures 23 and 24 extending transversely through the sides 19—20 and 21—22, respectively, in normally related directions, these being off-set from a transverse median line to avoid intersection and enable the connection of the furcations 16 and 17 to the block 18. This is effected by means of pivoted pins 25 and 26 which extend through the apertures 23 and 24, respectively, and between the furcations 16 and 17 to effect a joinder therebetween. To this end, the heads of the pins 25 and 26 are swaged to preclude removal and enable pivotal movement of the joint parts 14 and 15 in right-angular directions relative to the connecting block 18.

The joint parts 14 and 15 are freely movable in right-angular directions relative to the connecting block 18, and are arranged to enable the connected parts to assume angular positions in normal planes. In the present embodiment, the universal joint parts 14 and 15 are maintained in adjusted angular relation by spring means initially comprising flat disc shaped washers, in this instance two, which are bent or rendered convex or irregular in configuration so that the surfaces thereof will resiliently and frictionally engage the confronting surfaces of the connecting block 18. The spring washers 27 are, therefore, constructed from steel and tempered to present the warped effect and provide resilience in a direction normal to the plane surfaces thereof.

To this end and to provide for the confinement of the springs 27 between the confronting surfaces of the joint members 14—15 and their connecting block 18, the surfaces 19 and 21 of the block 18 are preferably countersunk to provide recesses or circular grooves 28 and 29 concentrically of their pin bores 23 and 24, respectively, for the reception of the spring members 27. The countersunk recesses 28 and 29 concentric with the pin bores 23 and 24 are provided in the connecting block 18 proximate to the extremities 30 and 31 thereof to enable the lodgement of the convex spring members 27 therein to slightly project beyond the surfaces 19 and 21 thereof so as to engage the confronting interior surfaces of the furcations 16 and 17 of the connecting block 18 for frictional contact therewith. Accordingly, the resiliency of the washers 27 serves to establish frictional engagement to preclude free movement of the connected parts 14 and 15 except in response to manual adjustment. The frictional contact established between the furcations 16—17 and the connecting block 18 through the medium of the spring members 27, is such as to preclude accidental relative displacement therebetween.

In effect, a rigid connection is available for predetermined angular adjustment to enable the registry of the socket 10 or other attachment with a nut, bolt head or cap screw not ordinarily accessible. This is important, for it is exceedingly advantageous in effecting immediate registry by preadjustment of the angular relation of the universal joint elements 14 and 15 to avoid the obstruction and effect registry with the normally inaccessible parts with a wrench socket, screw driver head or other tool. Once the tool is in registry with the part to be turned, the springs 27 offer no resistance to or interference with the normal universal joint movement. Various right-angular adjustments within a wide range to offer the advantages of a flexible universal or other tool handle joint with the preferred characteristics of a rigid connection, are thus available.

It is to be noted that member 14 telescopically receives the wrench socket 10 so that detachment is instantaneous for accommodating other sized sockets or tools manipulated responsive to the handle member 11. This enables the connected detachment in accordance with well established practice and enlarges the utility of the tool. It will be apparent, therefore, that an inexpensive, compact, dependable and highly effective tool joint has been provided which is normally rigid and yet flexible for adjustment and operative use. Thus the combined advantages of a rigid and flexible joint.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claim.

I claim:

In a hand tool of the character described, the combination with a member having bifurcated extremities, of another member complemental to said bifurcated extremities to define a turning tool joint having adjacent relatively sliding smooth surfaces, there being aligned bores projecting through said relatively sliding surfaces in said members, said bores being of small uniform diameter compared to the area of said relatively sliding surfaces in both members, a pin conforming in diameter with and extending through the aligned bores in said complemental members for effecting their pivotal connection, there being a shallow recess in one of said relatively sliding member surfaces concentric with and comparatively larger than the diameter of said pin extending therethrough, and a normally curved thin spring disc having a central aperture and a substantially imperforate surrounding annular body mounted in said recess encircling said pin to retain said members in frictional adjusted pivotal relation through the urge exerted by the flat annular body of said curved spring disc.

GIDEON R. GAGNE.